May 21, 1935.  M. UYEMATSU  2,002,164
METHOD OF DEVELOPING ORNAMENTAL PLANTS FROM ORDINARY VEGETABLE PLANTS
Filed Jan. 2, 1934
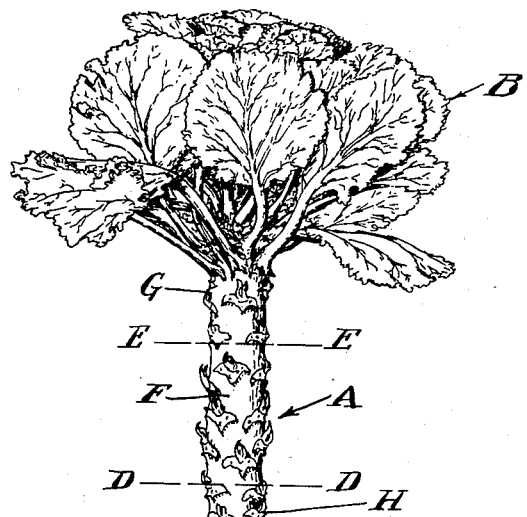
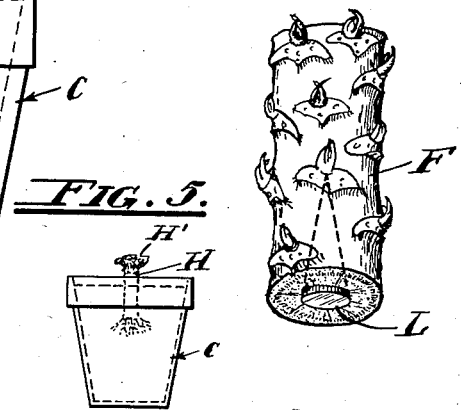
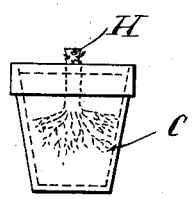
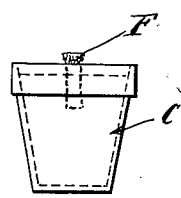
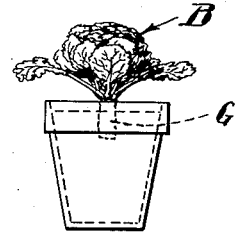
Inventor
Miyosaku Uyematsu.
By Edward M. Kojima
Attorney Patented May 21, 1935

2,002,164

UNITED STATES PATENT OFFICE 2,002,164

METHOD OF DEVELOPING ORNAMENTAL PLANTS FROM ORDINARY VEGETABLE PLANTS

Miyosaku Uyematsu, Montebello, Calif.

Application January 2, 1934, Serial No. 704,953

3 Claims. (Cl. 47—58)

This invention has for one of its objects the provision of a novel method whereby a live vegetable plant having little or no ornamental value, for example a plant of the species "Brassica oleracea", may be quickly transformed into a "flower" plant having noteworthy ornamental and unusual color propensities together with the property of maintaining its ornamental qualities and its colors for a comparatively long period of time while being maintained as a live plant.

Another object of this invention is to provide a method such as above described, with which a plurality of ornamental plants, having the aforesaid novel characteristics, may be created from a single stalk and foliage bloom taken from an ordinary live vegetable plant, in a comparatively short time and without seed propagation.

A further object is to provide a plant creation method of the nature herein noted, by means of which a variety and a novel intensity of color effects as well as a controlled color change and a retarded fading action may be secured in a simple and efficacious manner.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to the drawing:

Fig. 1 is a side elevation schematically arranged, of a rooted, growing plant as created under the method of this invention;

Fig. 2 is a side elevation showing the result of one step of the method which comprises drawing the plant of Fig. 1 in three plants;

Fig. 3 is a side elevation showing the intermediate stalk part of the plant of Fig. 1, as when set for growth under this method;

Fig. 4 is a side elevation of the bloom of the plant shown in Fig. 1, as when set for growth and as one of the plant creations possible under this method;

Fig. 5 is a side view of a budding plant;

Fig. 6 is a perspective showing a special treatment;

Fig. 7 is a perspective showing another treatment.

Referring more specifically to the illustrations of the drawing for the purpose of illustrating a method of the invention, the stalk A with its leafy bloom B is that of a cabbage plant and is set in earth in a flower pot C. I have found that the cabbage plant "Brassica oleracea" is best suited for carrying out the method of my invention as it is characterized by a long stalk and intense colors of its bloom or head before the bloom or head opens up or begins to fade, whereas other cabbage species as a rule do not develop a long stalk until ready to go to seed and when the leaf bloom is faded out and ready to fall.

By cutting off a stalk of the species above named, having its characteristic tight and freshly colored bloom, with the stalk either of the length indicated in Fig. 1 or in Fig. 4, the stalk may be planted in soil or in water, but moist soil is preferable. If cut long, as shown in Fig. 1, the stalk may be cut at the dotted line E—E and D—D shown in Fig. 1. Obviously more than one intermediate section may be cut, but as here shown but one middle section is provided and such section is designated F. The other sections G and H being the top or bloom section and the bottom or root section, respectively, may, as well as the section F be set in soil in pots, as indicated in Figs. 2, 3 and 4.

If the stalk of the common live plant be cut into three sections, as hereinbefore pointed out, the sections are subject to immediate planting and will take root, the top section G being at once an ornamental plant (see Fig. 4) having flower-like, intense color qualities which are enhanced and maintained as a result of the cutting of the stalk as hereinbefore noted. The growth of the plant is retarded during the rooting period, and as a result the deep colors are maintained for long periods without fading. The other sections F and H will take root and subsequently develop several buds and blooms each appearing as a plant having the appearance of Fig. 4.

Another phase of the method of this invention is that of dividing a rooted and fully developed flower plant created by the first described method. Assuming that the rooted plant of Fig. 1 has been developed from the plant top set in as shown in Fig. 4, it may then be divided into sections as previously explained, and such sections when rooted will have a tighter bloom or head with colors of deeper hue and of different shade than the first developed bloom.

In Fig. 5 is shown a new plant such as created by this method with buds H' starting and the rooting process under way.

In Fig. 6 is shown a method of treating to intensify and change the coloring of the bloom. To accomplish this a small piece of impervious material K such as a drop of tar or like impervious adhesive is placed at the center of the stalk F at the end to be planted. This retards the feeding of the plant through the center of the stalk and apparently such action has the faculty of intensifying and effecting the colors of the center leaves of the bloom. I may in some cases use chemicals, iron or the like, which are known to produce color variations in flowers. In such cases a small amount of such a chemical agent may be placed under the small piece of material K whereby to be absorbed by the stalk.

Referring to Fig. 7, it is seen that the results of Fig. 6 may be accomplished by use of a plug L. Such a plug inserted in the end of the cutting to be planted in the ground will act in the same manner as the part K in Fig. 6. However, the plug may comprise a chemical substance which is calculated to change the colors of the bloom or prolong the life or fertilize the plant as a whole, while at the same time act as does the piece K.

It is now apparent that the method of this invention contemplates the propagation of plants to the end that one stalk with a bloom thereon of the ordinary cabbage plant may be treated to provide at once a flower-like plant of unusual and highly ornamental color values as well as of artistic contours, together with other plant cuttings which when planted will rapidly develop into ornamental plants, from which other cuttings may be made in repeating the method hereof.

I claim:

1. The method of developing ornamental plants from a vegetable plant, which consists in dividing a stalk having a leaf bloom thereon, which stalk is cut from a live vegetable plant, into a plurality of sections one of which includes the bloom, then separately planting each section in moist soil or in water, including the step of treating the center portions only of the planted ends of the divisions of the stalk by applying pieces of material to said portions before the planting thereof.

2. The method of developing ornamental plants from a vegetable plant, which consists in dividing a stalk having a leaf bloom thereon, which stalk is cut from a live vegetable plant, into a plurality of sections one of which includes the bloom, then separately planting each section in moist soil or in water, together with the step of treating of the center portions only of the planted ends of said divisions of the stalk by the application of chemical agents thereto before planting thereof.

3. The method of developing ornamental plants from a vegetable plant, which consists in dividing a stalk having a leaf bloom thereon, which stalk is cut from a live vegetable plant, into a plurality of sections one of which includes the bloom, then separately planting each section in moist soil or in water, together with the step of treating of the center portions of the planted ends of said divisions of the stalk by the application of chemical agents thereto before planting thereof, and by also rendering only said center portions impervious to moisture.

MIYOSAKU UYEMATSU.